Feb. 19, 1957
J. C. PLASTARAS
2,781,598
TYPOGRAPHIC NEGATIVE FILM
Filed July 3, 1951
2 Sheets-Sheet 1
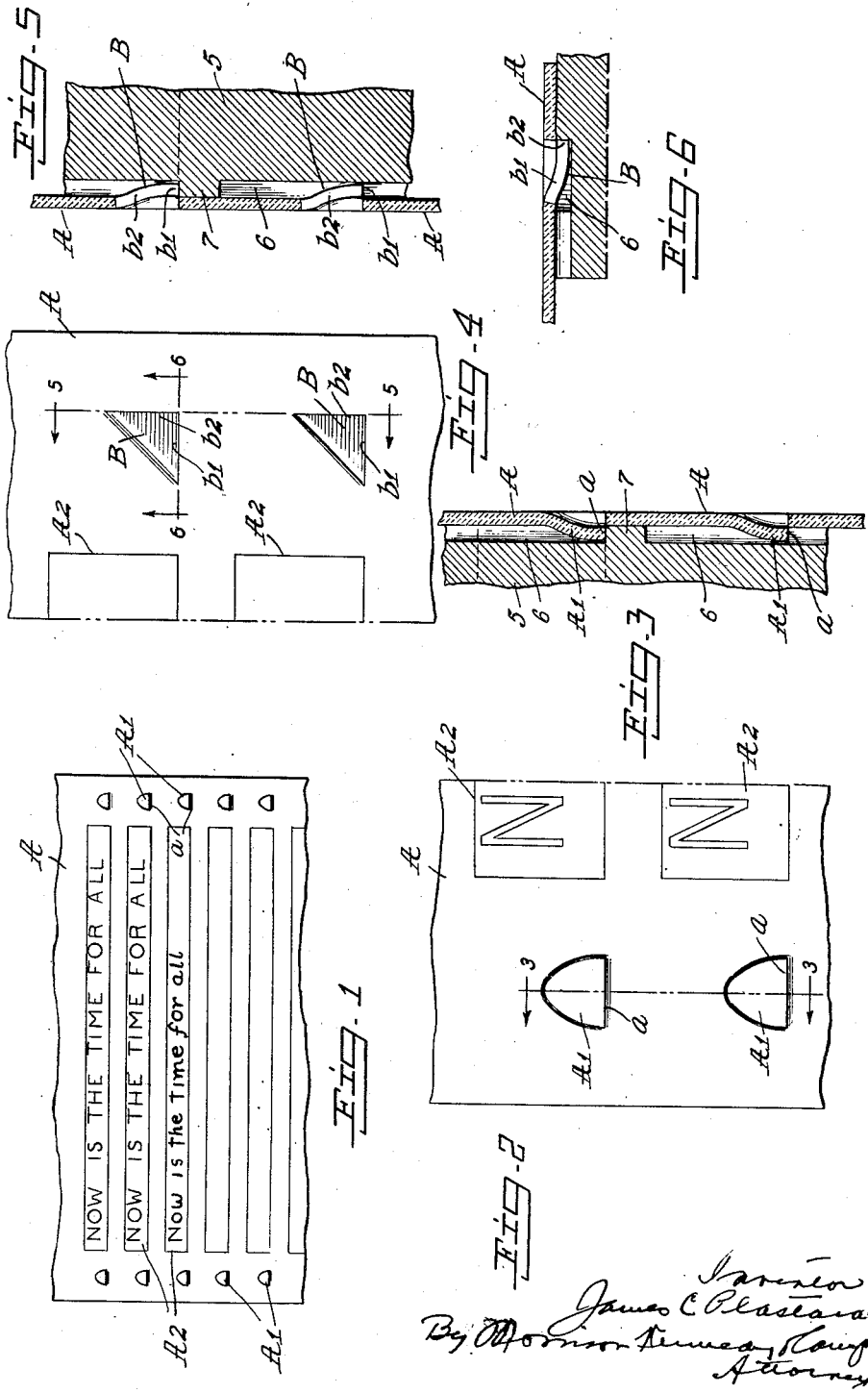

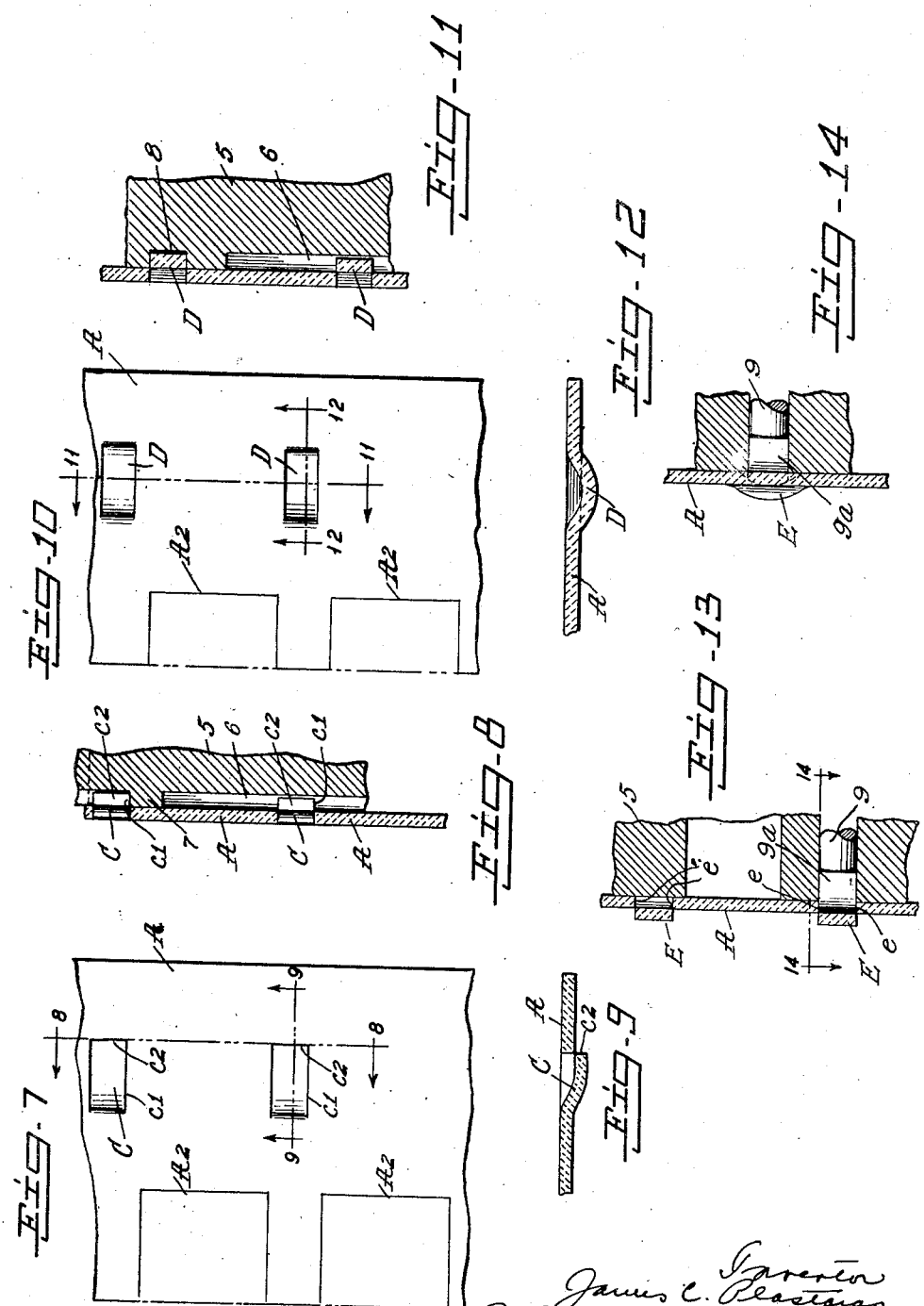

United States Patent Office 2,781,598
Patented Feb. 19, 1957

2,781,598

TYPOGRAPHIC NEGATIVE FILM

James C. Plastaras, Lynbrook, N. Y., assignor to Mergenthaler Linotype Company, a corporation of New York Application July 3, 1951, Serial No. 234,980

5 Claims. (Cl. 41—46)

This invention contemplates certain improvements in the sensitized typographic films produced in photocomposing machines such as the one shown and described in my pending application for Letters Patent, filed September 9, 1950, Serial No. 184,038, now Patent No. 2,691,924, and wherein composed lines of type elements or matrices bearing photographically reproducible characters are delivered and justified between a pair of line clamping jaws in front of an extensible camera during each machine cycle of operation, the head and the lens carrier of the camera being capable of adjustment simultaneously toward and from each other to set the latter for selected magnifications or reductions of the justified lines, and the film feed mechanism for the camera being automatically adjustable to correspond with the different camera settings. After the film is developed, a negative is made and through any of the well known "letter press," "planographic" or "intaglio" processes, printed copies in quantity may readily be obtained therefrom.

Specifically, the invention contemplates a sensitized film having marginal protuberances which are formed by a combined slitting and stamping operation (say at the time of justification) near the opposite edges of the film and which are spaced apart to accord with the spacing required between the composed lines. These protuberances may be produced in different shapes and individually present one or more surfaces perpendicular to and offset from the plane of the film, whereby the latter after development may be accurately located on a cutout fixture so as to bring any single type line on the film into the cutout position for correction or replacement. Heretofore, films for such purposes have been formed with marginal perforations which have to be masked out when the film is developed into a negative, whereas according to the present invention the locating surfaces of the protuberances project from but not beyond the contiguous face of the film and hence do not transmit light. As a result, the opaque background of the film will present no discontinuity to light, and since there is no waste material removed from the film during the shaping operation, there will be no problem to solve in the disposal of such material.

Referring to the drawings:

Fig. 1 is a schematic elevation showing a developed film formed with marginal protuberances and the position they occupy in relation to type lines reproduced thereon;

Fig. 2 is a fragmentary view on a greatly enlarged scale of a portion of the film shown in Fig. 1;

Fig. 3 is a vertical section taken on the line 3—3 of Fig. 2 showing the film located on a portion of the cutout fixture by means of the protuberances;

Fig. 4 is a fragmentary view similar to Fig. 2 but showing marginal protuberances formed with two locating surfaces disposed at right angles to each other;

Fig. 5 is a vertical section taken on the line 5—5 of Fig. 4 showing the film located lengthwise on the cutout fixture;

Fig. 6 is a horizontal section taken on the line 6—6 of Fig. 4 showing the film located edgewise on the cutout fixture;

Fig. 7 is a fragmentary view similar to Figs. 2 and 4 but showing marginal protuberances differing in shape from those shown in Fig. 4 and also having two locating surfaces disposed at right angles to each other;

Fig. 8 is a vertical section taken on the line 8—8 of Fig. 7 showing a portion of the cutout fixture whereon the film is located by means of the protuberances shown in Fig. 7;

Fig. 9 is a horizontal section taken on the line 9—9 of Fig. 7;

Fig. 10 is a fragmentary view similar to Fig. 7 but showing marginal protuberances formed with a pair of locating surfaces parallel to each other;

Fig. 11 is a vertical section taken on the line 11—11 of Fig. 10 showing the film located positively lengthwise by the engagement of the protuberances in a corresponding slot formed in the cutout fixture;

Fig. 12 is a horizontal section taken on the line 12—12 of Fig. 10;

Fig. 13 is a vertical section similar to Fig. 11 but showing the protuberances formed on the reverse side of the film and engaging stud portions projecting from the cutout fixture; and Fig. 14 is a horizontal section taken on the line 14—14 of Fig. 13.

As shown in Figs. 1, 2 and 3, the improved film A is formed near its opposite edges with marginal protuberances $A^1$ which, as previously stated, are produced by a combined slitting and stamping operation or what might be termed a "blind" punching operation. The protuberances are spaced apart so as to conform with the spacing between adjacent type lines $A^2$ on the film and individually present (Fig. 3) a single locating surface $a$ perpendicular to and offset from the plane of the film, whereby the latter may be accurately positioned longitudinally on a cutout fixture 5 for any particular line that may be improperly composed and has to be replaced.

In certain classes of printed matter such as announcements, greeting cards, invitations, etc., the styles and point sizes of the characters in the type lines may vary considerably, and it is therefore proposed to form the protuberances $A^1$ on the film about the time it is exposed to light, so that their locating surfaces $a$ may be properly positioned with reference to the particular lines with which they are associated irrespective of the point size of the characters therein. In other words, and while the type lines $A^2$ on the film A are equally spaced apart, as shown in Fig. 1, the corresponding protuberances $A^1$ nevertheless bear a definite relation thereto, it being noted that the locating surfaces $a$ of the protuberances are horizontally aligned with the descenders of the type characters in the composed lines.

After the film is developed, a negative is made therefrom for the purpose hereinbefore mentioned, and in order to avoid marginal markings on the negative within the vicinity of the protuberances, the latter are produced in such manner, that while the locating surfaces $a$ thereof project sufficiently from the contiguous face of the film to serve their purpose, they do not (as shown best in Fig. 3) project beyond it. In other words, the offset locating surfaces $a$ are formed by non-light-transmitting incisions extending clear through the film and by displacing those portions of thte film material which define one wall of the individual incisions, the other wall of said incisions being left in the plane of the film.

Except for certain details in design about to be described, the cutout fixture 5 may be of any suitable construction and its mode of use is readily understood by those familiar with the art. Thus, the front or film supporting face of the fixture 5 (Fig. 3) is formed with shallow vertical slots 6 (only one being shown), which are spaced the proper distance apart and are of the proper width to freely accommodate the protuberances $A^1$ at the opposite sides of the film A. The fixture 5 also is formed within the slots 6 with horizontally aligned stop shoulders 7 to engage the locating surfaces $a$ of the protuberances $A^1$ associated with any single type line on the film that may have to be removed or cut out for purposes of replacement. In other words, by placing the film A against the front face of the fixture 5 with the protuberances $A^1$ engaging the vertical slots 6 and with those aligned with the defective line resting upon the stop shoulders 7, the film (Fig. 3) will be properly located lengthwise on the fixture to bring said line into the cutout position. In this particular instance, one edge of the film will be used to locate it edgewise on the fixture 5.

If desired, the protuberances of the film A may be shaped so as to present two locating surfaces instead of one, whereby the film may be positioned edgewise as well as lengthwise on the cutout fixture 5 for the purpose stated. For example, and as shown in 4, 5 and 6, the film A is formed with protuberances B which present one locating surface $b^1$ perpendicular to the contiguous side face of the film for locating it lengthwise on the fixture 5, and another similar locating surface $b^2$ disposed at right angles to the surface $b^1$ for locating the film edgewise on the fixture. The protuberances B (Fig. 4) are triangular in shape and their size is such that when the film A is placed properly against the fixture 5, the protuberances will be freely accommodated in the vertical slots 6 of the fixture. At such times, the offset locating surfaces $b^1$ of the two protuberances associated with the particular line to be replaced are adapted to engage the stop shoulder 7 of the fixture 5 to locate that line vertically in the cutout position, while the other offset locating surfaces $b^2$ of the protuberances are adapted to engage the side walls of the slots 6 which are directly opposed thereto and thus locate the line edgewise in the cutout position. In this connection, it may be mentioned that, while the locating surfaces $b^2$ of the protuberances B at either side of the film could be used to determine its edgewise location, only those at one side (say, at the right) need be selected in order that replaced lines may have the same marginal spacing as the other lines of type matter on the film.

As shown in Figs. 7, 8 and 9, the film A may be formed with protuberances C differing in shape from the protuberances B but also having two locating surfaces $c^1$ and $c^2$ which are disposed at right angles to each other and adapted, respectively, to serve in precisely the same manner as the locating surfaces $b^1$ and $b^2$ of the protuberances B, in squaring the film on the cutout fixture 5.

It may also be found desirable or advantageous to hold the film A on the fixture 5 against lengthwise movement in both directions as it is being squared thereon for correction purposes. To this end, the film A (Figs. 10, 11 and 12) may be formed with double parallel edge protuberances D shaped so as to fit into shallow horizontal grooves 8 of appropriate length and formed in the front face of the cutout fixture 5. The vertical slots 6 in the fixture 5 then would serve (as before, for the protuberances $A^1$) merely to accommodate the protuberances D, and one edge of the film would have to be used in accurately locating a line to be replaced edgewise in the cutout position.

Furthermore, and as another way to carry out the invention, the film A may be formed with protuberances (in any one of the different shapes herein described) which, instead of providing the locating surfaces, form locating notches in the film itself. Thus, for example, protuberances E (Figs. 13 and 14), shaped like the protuberances D but produced on the reverse face of the film A, provide notches with top and bottom walls $e$ adapted when the film is placed upon the fixture 5 to engage head portions $9^a$ of corresponding studs 9 which project slightly from the front face of the fixture, and through such engagement, sustain the film lengthwise in both directions in the cutout position. As best shown in Fig. 13, the head portions $9^a$ of the studs 9 are rectangular in shape so as to fit snugly against the upper and lower side walls $e$ of the film notches, but their front ends or faces are rounded off to conform with the displaced inner walls of the protuberances E. The distance the head portions $9^a$ of the studs protrude from the front face of the cutout fixture 5 is determined, of course, by the thickness of the film. One edge of the film, may be used in establishing its edgewise location on said fixture.

What is claimed is:

1. A single unitary phototypographic negative film having opaque portions and partially transparent portions which define photographic type line images fixed thereon, and spaced apart in the direction of its length, said opaque portions being located along opposite edges beyond the ends of the type line images, and permanent means in said opaque portions for locating the film lengthwise upon a cutout fixture for line correction purposes, said locating means comprising a plurality of pairs of permanent light-tight protuberances located in the opaque portions of the film and formed therefrom, there being one pair of protuberances for each type line and said pairs being spaced apart lengthwise of the film to accord with the spacing of the type line images, each of said protuberances being bounded on one side by a slit in the film to form opposed edge surfaces along said slit and being stamped from the body of the film beyond said slit to offset one of said edge surfaces from the plane of the film and from alignment with the other edge surface, to permit one of said surfaces to serve as a locating stop for engagement with a corresponding stop surface in the cutout fixture, while preventing the transmission of light through said opaque portions in the area of said protuberance.

2. The phototypographic film according to claim 1, characterized in that said protuberances present surfaces respectively for locating the film edgewise upon the cutout fixture.

3. The phototypographic film according to claim 1, characterized in that each of the protuberances in addition to said slit on one side thereof, is bounded on another side with another slit to form opposed edge surfaces along said other slit, the latter edge surfaces being offset to permit one of the latter edge surfaces to serve as a locating stop for engagement with a corresponding stop surface in the cutout fixture by which the film is located edgewise upon the cutout fixture, while preventing the transmission of light through said opaque portions in the area of said protuberance.

4. The phototypographic film according to claim 3, characterized in that the two slits bounding the two sides of each protuberance extend at right angles to each other.

5. The phototypographic film according to claim 3, characterized in that the two slits bounding the two sides of each protuberance extend at right angles to each other, one of the two slits extending parallel to the corresponding type line and serving as part of the means for locating the film lengthwise upon the cutout fixture, the other one of the two slits defining the edge surface serving as the locating stop for engagement with the corresponding stop surface in the cutout fixture for locating the film edgewise upon the cutout fixture.

References Cited in the file of this patent

UNITED STATES PATENTS 1,012,505    Benson et al. _____ Dec. 19, 1911

(Other references on following page)

UNITED STATES PATENTS

| | | |
|---|---|---|
| 1,213,514 | Lovejoy | Jan. 23, 1917 |
| 1,484,568 | Savage | Feb. 19, 1924 |
| 1,975,439 | Uher | Oct. 2, 1934 |
| 2,114,187 | Howell | Apr. 12, 1938 |
| 2,232,732 | Rogers | Feb. 25, 1941 |
| 2,499,100 | Kessler | Feb. 28, 1950 |

FOREIGN PATENTS

| | | |
|---|---|---|
| 7,885 | Great Britain | of 1907 |
| 276,008 | Italy | July 9, 1930 |
| 548,322 | Germany | Apr. 11, 1932 |
| 557,695 | Germany | Aug. 26, 1932 |
| 889,084 | France | Sept. 20, 1943 |